Patented Oct. 23, 1923.

1,472,011

UNITED STATES PATENT OFFICE.

YONG K. LEE, OF CHICAGO, ILLINOIS, ASSIGNOR TO THE BORROMITE COMPANY OF AMERICA, OF CHICAGO, ILLINOIS, A CORPORATION OF ILLINOIS.

BASE-EXCHANGE SILICATE AND PROCESS OF PREPARING THE SAME.

No Drawing.    Application filed October 8, 1920. Serial No. 415,524.

*To all whom it may concern:*

Be it known that I, YONG K. LEE, a citizen of Korea, residing at Chicago, in the county of Cook and State of Illinois, have invented certain new and useful Improvements in Base-Exchange Silicates and Processes of Preparing the Same, of which the following is a specification.

This invention relates to the preparation of base exchange silicates for technical use, the object being to provide a material of high base exchanging capacity, one which may be rapidly regenerated, and which will remain active for an extended period of time, that is to say, its efficiency will not be lost by repeatedly passing through repeated use, and regeneration which, in the softening of water, for instance, consists in the exchange of sodium and potassium in the material for the calcium and magnesium in the water, and reversely, the release of the latter bases and reabsorption of potassium or sodium from the regenerating solution, which may be brine from common salt.

Various processes for the preparation of materials, having, or capable of acquiring, base exchanging properties, have been proposed, but owing to the substances employed, or the treatment administered, the resulting products have been lacking in the activity, durability and adaptability for rapid regeneration, demanded by commercial practice.

The most satisfactory substance for the preparation of base exchanging material that I am aware of is glauconite commonly known as green-sand such as is found in crude form in the vicinity of Birmingham, Burlington County, New Jersey. In its natural state it posesses base exchanging properties and occurs in a physical form readily adaptable for employment as a water softening agent. According to one of the known methods now in wide use, this green-sand may be fitted for commercial practice by merely baking it and subsequently treating it with salt brine.

I have found, however, that a better and cheaper product can be made by subjecting this material to the action of sodium silicate and sodium aluminate at substantially the temperature of boiling water, and that the product thus prepared has greater activity, longer life, greater coherence, and can be more rapidly regenerated and more economically utilized, than the baked green-sand or the product of any of the other processes and materials heretofore prescribed for the same general purpose. Untreated glauconite used for water softening produces turbid water. Even after a substantial number of uses and regenerations the water will be found discolored and the treatment with silicate eliminates, or reduces to a negligible point, this turbidity.

In carrying out the process of this invention I may proceed by way of example as follows:

Approximately two tons of material, similar to that found in the deposit to which I have referred, is thoroughly washed and screened, to select the particles which pass through a 20 mesh screen but fail to pass through an 80 mesh screen. Approximately one-half of the material is thus selected and retained, the remainder representing impurities and unsuitable residue. The selected particles are again washed, this time preferably in the waste solution remaining after the boiling step hereafter to be described. To one ton of the selected particles forty gallons of a solution of sodium silicate of 10° Baumé are added and the mixture boiled for five minutes under agitation; at the end of which time four gallons of 10° Baumé solution of sodium aluminate are added and the boiling and agitation continued for fifteen minutes, water being added from time to time to maintain the original volume. The solution is then drawn off and passed to a storage tank from which it may be drawn and used for the final washing of the material preliminary to boiling. The treated material is then washed until the wash water runs clear and neutral, after which the material is dried at a temperature of substantially 212° F. and again passed through 20 mesh and over 80 mesh screens to remove the trace of undesirable material still remaining. It is then ready for use.

The treated product is readily distinguished from the untreated by its increased hardness, increased content of silica and sodium and by its more pronounced green coloring. It may be distinguished from baked glauconite by its greater resistance to the erosive action of water, by the fact that its iron is present in a lower state of oxidation, and by its green color, the baked product being brown.

Wherever I have used the term "green-sand" herein, I wish to be understood as referring to the deposit in the vicinity of Birmingham, Burlington County, New Jersey, or any material of equivalent physical and chemical characteristics.

The effect of this treatment is to provide a film or coating of sodium aluminum silicate upon the glauconite particles so that the glauconite particles act as carriers for a pure artificial water softening base exchange silicate.

I claim:

1. The process of preparing a base exchange silicate which comprises boiling green-sand in a solution of sodium silicate, subsequently adding a solution of sodium aluminate and continuing the boiling.

2. The process of preparing a base exchange silicate which comprises boiling green-sand in a substantially 10° Baumé solution of sodium silicate, adding a substantially 10° Baumé solution of sodium aluminate and continuing the boiling.

3. The process of preparing a base exchange silicate which comprises boiling green-sand for about five minutes in a substantially 10° Baumé solution of sodium silicate, adding a substantially 10° Baumé solution of sodium aluminate and continuing the boiling for about fifteen minutes.

4. The process of preparing a base exchange silicate which comprises treating green-sand with a solution of sodium silicate and a solution of sodium aluminate.

5. The process of preparing a base exchange silicate which comprises treating green-sand successively with a solution of sodium silicate and with a solution of sodium aluminate.

6. The process of preparing a base exchange silicate which comprises treating refined green-sand with a solution of sodium silicate and a solution of sodium aluminate.

7. The process of preparing a base exchange silicate which comprises treating refined green-sand successively with a solution of sodium silicate and with a solution of sodium aluminate.

8. The process of preparing a base exchange silicate which comprises the treatment of substantially one ton of glauconite for about five minutes with a solution of about forty gallons of sodium silicate substantially 10° Baumé, then adding about four gallons of sodium aluminate substantially 10° Baumé, boiling for about fifteen minutes, agitating the mixture during the treatment, then removing the solution and washing and drying the thus treated glauconite.

9. The process of preparing a base exchange silicate which comprises the treatment of substantially one ton of refined glauconite for about five minutes with a solution of about forty gallons of sodium silicate substantially 10° Baumé, then adding about four gallons of sodium aluminate substantially 10° Baumé, boiling for about fifteen minutes, agitating the mixture during the treatment, then removing the solution and washing and drying the thus treated glauconite.

10. The process of preparing a base exchange silicate which comprises washing and screening glauconite to select particles which pass through a screen substantially 20-mesh but fail to pass through a screen substantially 80-mesh, treating substantially one ton of the so refined glauconite for about five minutes with a solution of about forty gallons of sodium silicate substantially 10° Baumé, then adding about four gallons of sodium aluminate substantially 10° Baumé, boiling for about fifteen minutes, agitating the mixture during the treatment, then removing the solution and washing and drying the thus treated glauconite.

11. A base exchange silicate, comprising natural base exchange silicate particles having a coating of artificial base exchange silicates.

12. The process of preparing a water softening material, comprising precipitating upon a natural base exchange silicate a coating of base exchange silicate from the reaction of sodium aluminate and sodium silicate.

In testimony whereof I have hereunto subscribed my name in the presence of two subscribing witnesses.

YONG K. LEE.

Witnesses:
C. S. BUTLER,
F. W. WARDEN.